United States Patent [19]

Suciu

[11] Patent Number: 4,715,779
[45] Date of Patent: Dec. 29, 1987

[54] BLEED VALVE FOR AXIAL FLOW COMPRESSOR

[75] Inventor: Gabriel L. Suciu, Glastonbury, Conn.

[73] Assignee: United Technologies Corporation, Hartford, Conn.

[21] Appl. No.: 681,331

[22] Filed: Dec. 13, 1984

[51] Int. Cl.⁴ .............................................. F01B 25/00
[52] U.S. Cl. .................................... 415/144; 415/145;
60/226.1; 60/39.07; 60/39.83; 251/229
[58] Field of Search ................. 60/226.1, 39.07, 39.29,
60/39.83; 415/11, 27, 28, 144, 145; 251/229,
250, 86, 248; 74/29

[56] References Cited

U.S. PATENT DOCUMENTS

| | | | |
|---|---|---|---|
| 3,638,428 | 2/1972 | Shipley et al. | 60/226.1 |
| 4,009,775 | 3/1977 | Wolfelsperger et al. | 74/29 |
| 4,060,981 | 12/1977 | Hampton | 60/226.3 |
| 4,165,583 | 8/1979 | Meyer | 74/30 |
| 4,390,318 | 6/1983 | Weiler | 415/28 |
| 4,430,043 | 2/1984 | Knight et al. | 415/159 |
| 4,463,552 | 8/1984 | Monhardt et al. | 60/226.1 |
| 4,546,605 | 10/1985 | Mortimer et al. | 60/39.07 |

FOREIGN PATENT DOCUMENTS

| | | | |
|---|---|---|---|
| 520902 | 7/1953 | Belgium | 251/248 |
| 458264 | 3/1928 | Fed. Rep. of Germany | 251/248 |

Primary Examiner—Louis J. Casaregola
Assistant Examiner—Donald E. Stout
Attorney, Agent, or Firm—Norman Friedland; Charles A. Warren

[57] ABSTRACT

A bleed valve construction for a multistage axial flow compressor in which a series of bleed doors in frames located between adjacent struts of a support case between successive stages of the compressor are actuated by a ring that has only circumferential movement imparted by a rack on the ring driven by a motor supported pinion.

7 Claims, 4 Drawing Figures

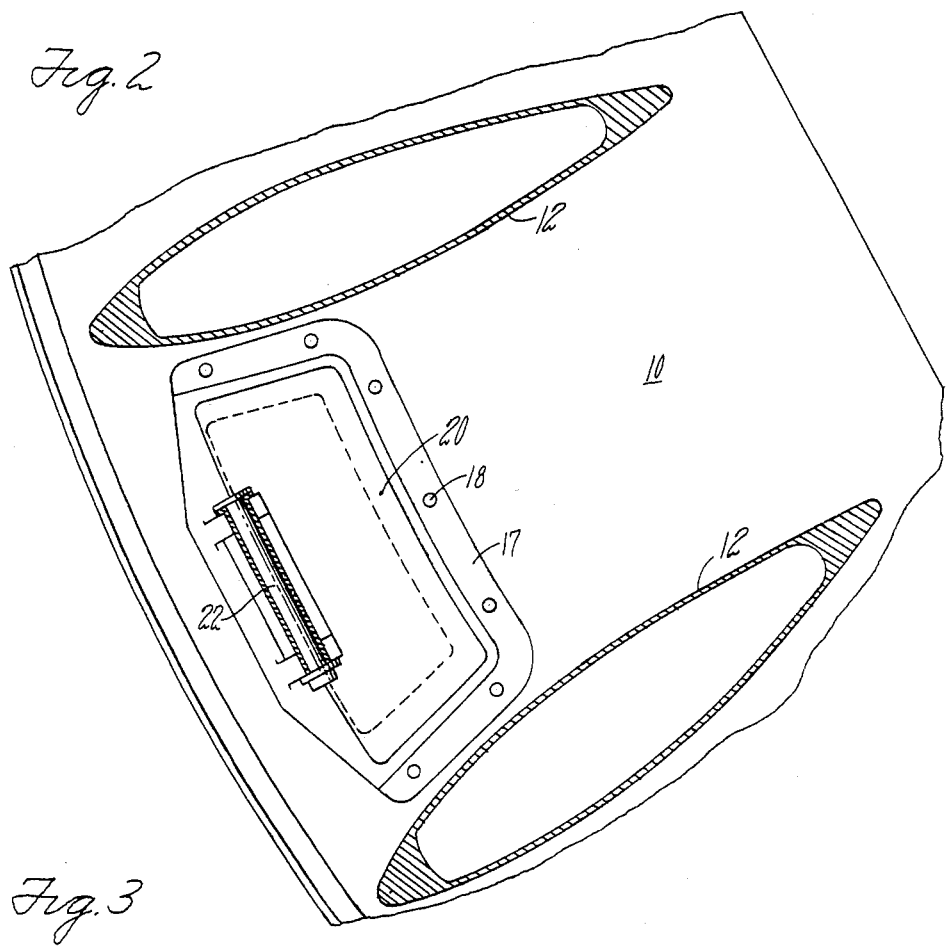
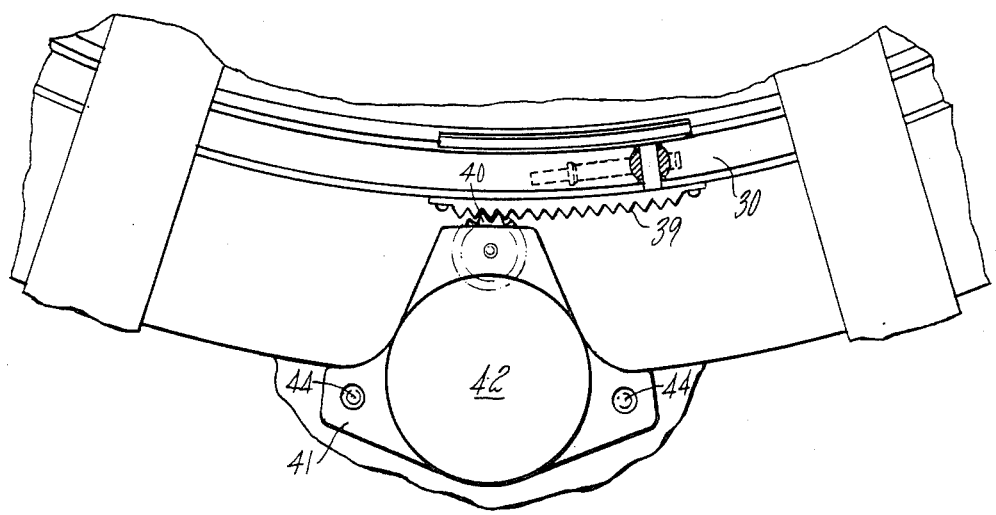

BLEED VALVE FOR AXIAL FLOW COMPRESSOR

DESCRIPTION

1. Technical Field

This invention relates to devices for bleeding an intermediate stage of an axial flow compressor during operation by opening bleed doors in the walls of the gas path.

2. Background of the Invention

Compressor bleed mechanisms are of many varieties. One device is shown in Hasbrook U.S. Pat. No. 3,057,541 and utilizes a peripheral ring that is moved both axially and circumferentially to open the vent openings that allow for the escape of the bleed air. This ring is acuated through a series of bell crank liners moved in turn by hydraulic motors. This arrangement has been satisfactory in general. The only objections are the dual motion of the ring and the need for hydraulic lines to the several actuating motors.

One form of actuation of the compressor bleed devices is shown in Shipley U.S. Pat. No. 3,638,428 in which the valve ring is replaced by valve doors actuated from a circumferentially movable ring which in turn is moved by hydraulic motors. In this device the doors direct the bleed air directly to the surrounding fan air duct. This represents a loss in energy as the bleed air pressure is substantially higher than the air pressure in the surrounding fan duct.

Monhardt U.S. Pat. No. 4,463,552 shows a bleed system in which the ring is moved circumferentially to align holes therein with the bleed passages in the case and in this it is similar to the Hasbrook patent above mentioned. This patent does not show an actuating mechanism but it would no doubt be similar to that in the other patents mentioned and would necessitate several actuating devices for controlling the position of the valve. The mechanical connections are complicated and all require a unison ring with both rotation and translation during actuation. It is desirable to have a simpler system that would eliminate the dualing motion and would also simplify the operation of the device.

DISCLOSURE OF THE INVENTION

A feature of the present invention is the actuation of the bleed doors by a unison ring actuated only rotationally by a rack and pinion from a driving motor thus reducing the complexity of the actuating system and utilizing an actuation that applies essentially only a tangential force that reduces extraneous loads on the ring. The valves are located in the outer wall of the intermediate support strut.

Another feature of the invention is the location of the bleed doors in the inner wall of the plenum chamber surrounding the compressor and surrounded in turn by the fan duct. This chamber connects with the fan and, through openings in the inner wall of the duct, also connects through ducting on the rearward wall of the chamber with the oil cooler, the duct having a suitable valve by which to control the quantity of bleed air directed through the fan duct and through the oil cooler.

According to the present invention the outer wall of the compressor at the intermediate case location has bleed doors positioned between the intermediate struts and operable by links connected directly to a unison ring. This ring in turn is actuated from a pinion driven by a suitable motor and the only motion necessary is circumferential. The pinion engages a rack on the unison ring and through this rack and pinion only a tangential force is applied to the ring but this single direction of movement of the ring is all that is necessary to operate the doors.

The intermediate struts are enclosed in the plenum chamber into which the bleed doors allow the bleed air to vent. The outer wall of the plenum chamber is the inner wall of the fan duct and this wall has bleed openings for the escape of bleed air into the fan duct. The rearward wall of the plenum chamber has a valved duct that connects to an oil cooler and adjustment of this valve determines the amount of bleed air going directly from the plenum chamber through the inter cooler for the oil or directly to the fan duct.

The foregoing and other objects, features and advantages of the present invention will become more apparent from the following description of preferred embodiments and accompanying drawings.

BRIEF DESCRIPTION OF DRAWINGS

FIG. 2 is a transverse developed section along the line 2—2 of FIG. 1.

FIG. 3 is a transverse elevational view generally on the line 3—3 of FIG. 1 showing the actuating ring and rack and pinion.

BEST MODE FOR CARRYING OUT THE INVENTION

Figure 1:
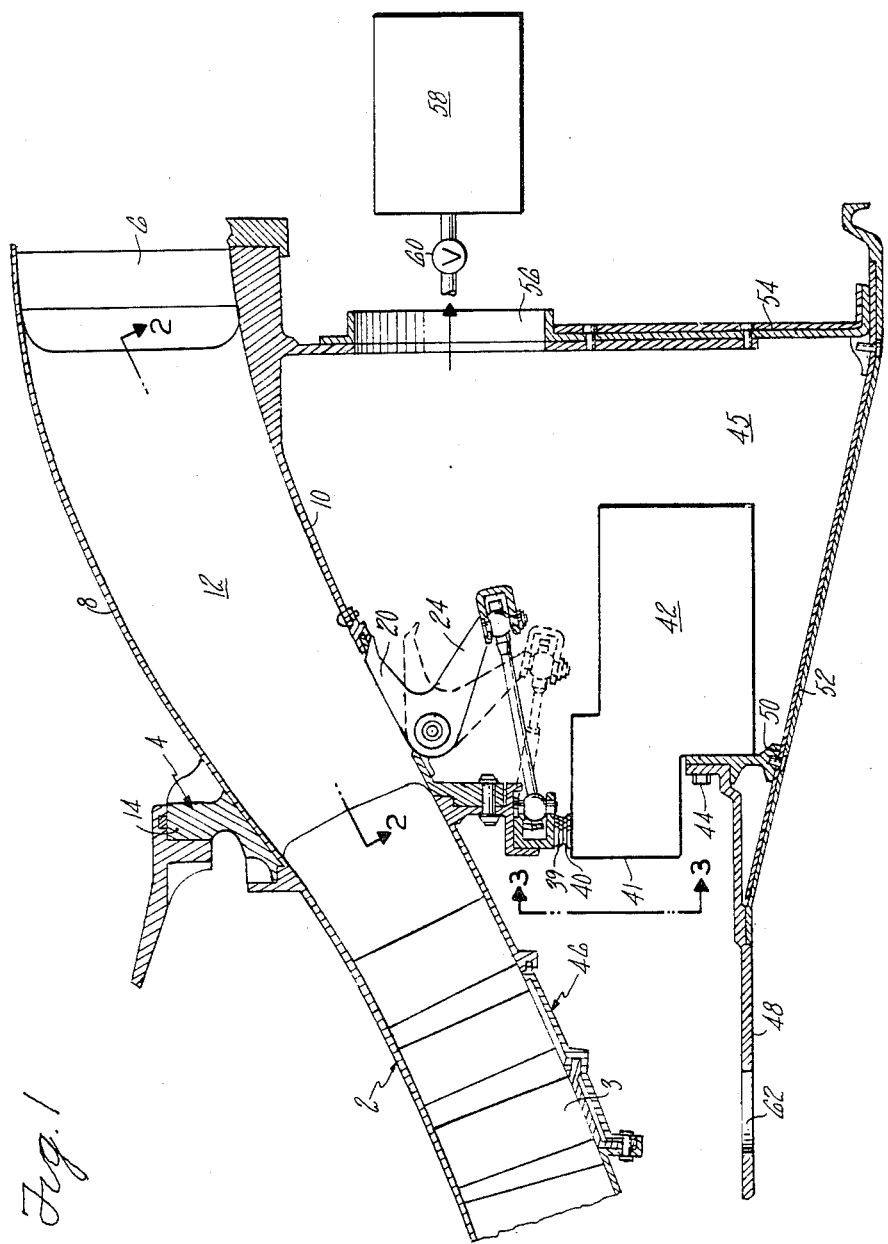
FIG. 1 is a longitudinal sectional view of a portion of the engine including a portion of the fan duct compressor in the intermediate case.

The invention is shown as applied to a multistage multirotor axial flow compressor 2 having a series of low pressure stages 3 upstream of the intermediate case 4 and a plurality of high pressure stages only the inlet 6 of which is shown downstream of the case 4. The intermediate case 4 has an inner wall 8 and an outer wall 10 interconnected by struts 12 which serve to space the walls apart and define the gas path for the compressor. The inner wall has a mounting flange 14 that serves to support a bearing or bearings not shown for one or both of the rotors. This is not a part of the invention and will not be described in detail.

Figure 4:
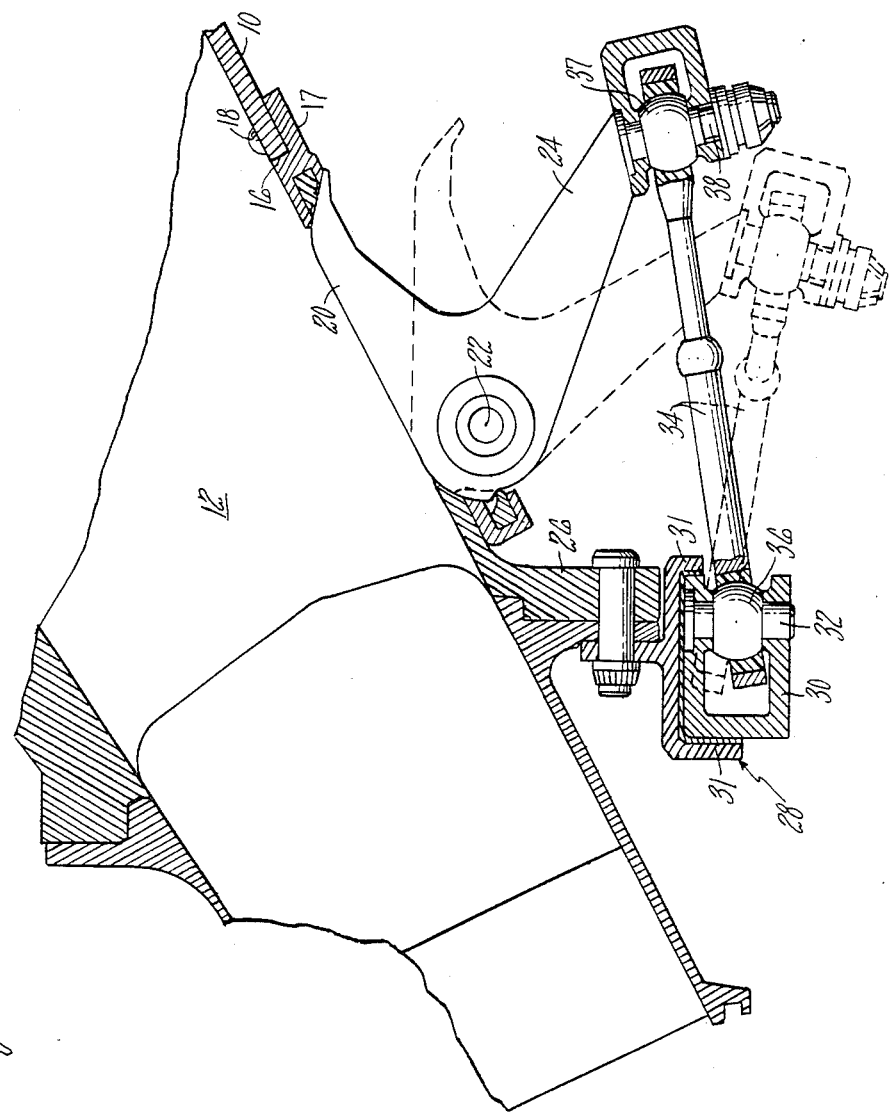
FIG. 4 is an enlarged detail of a portion of FIG. 1 with one of the bleed doors open.

For the purpose of bleeding the compressor during starting or during certain transient conditions of operation of the engine, the outer wall 10 has openings 16 therein, FIG. 4, to which are attached bleed door frames 17 as by rivets 18, FIG. 2. These openings and frames are located between adjacent struts as best shown in FIG. 2. Bleed doors 20 are hinged to the frames along the upstream edge of the frame as by pins 22, and each door has an arm 24 extending therefrom for actuating the door.

An outwardly projecting flange 26 on the outer wall 10 supports an annular guide 28 which received an actuating ring 30, FIG. 4. This guide has spaced flanges 31 which guide the ring and prevent axial movement thereof. This ring 30 has spaced radial extending pins 32 on which are mounted links 34 on ball joints 36. The other end of each link 34 is attached to the outer end of one of the arms 24 also by a balljoint 37 and pin 38. Thus as the ring 30 is moved circumferentially the bleed doors will be opended or closed to the desired extent by the circumferential movement of the ring.

For actuating the ring it has a rack segment 39 to mesh with a pinion 40, FIG. 3, the latter being supported by a housing 41 of a motor 42 which may be actuated hydraulically or pneumatically depending on the installation. The motor housing may be held in position by bolts 44 as shown in FIG. 1. The devices that control the motor for opening or closing of the bleed doors are responsive to one or another engine operating parameter that would indicate the need for opening or closing the bleed doors. One parameter may, for example, be the compressor inlet pressure or the pressure drop across the compressor.

It will be understood that a suitable signal would cause operation of the motor in the proper direction for removing the valve in the appropriate direction to open or close the bleed doors as the control engine parameters indicate as necesasry. The present invention is the positioning and location of the doors as above-described and the actuation of the doors by a ring that requires only circumferential movement to move the doors. The arrangement is believed to be a novel system for bleeding the compressor having the advantage of being relatively simple as compared to the prior art as well as providing a weight and cost reduction in the engine.

The air passing the bleed valves enters a plenum chamber 45 surrounding the intermediate case outer wall 10. The inner wall of this plenum chamber is defined by the outer wall 10 of the case and a portion of the outer case 46 of the low pressure compressor. The outer wall is a surrounding outer case element 48 of the intermediate case having at least one access opening 50 closed by a panel 52. The downstream end of the plenum chamber is an end wall 54 of the intermediate case. This wall has a vent opening 56 into an oil cooler 58 through which the bleed air may be directed as required. A suitable valve shown diagrammatically at 60 may be utilized for controlling the flow into the cooler. Any excess of air in the plenum chamber may vent through the outer wall through metered openings 62 into the fan air passage that surrounds the wall 50.

It should be understood that the invention is not limited to the particular embodiments shown and described herein, but that various changes and modifications may be made without departing from the spirit and scope of this novel concept as defined by the following claims.

I claim:

1. A bleed valve construction for a multistage compressor including:
   a support case having spaced inner and outer walls defining an air duct for the compressor between them and struts extending between the walls across the air duct, said struts and the case being located between adjacent stages of the compressor,
   bleed doors mounted in openings in the outer wall of the case between adjacent struts and being movable into open or closed position, each door having a projecting arm thereon,
   an actuating ring mounted on said outer case in spaced relation to said door and means contraining said ring to move circumferentially without axial movement,
   a plurality of links connecting the ring to the doors, one link for each door for moving the doors in unison into open or closed position in response to circumferential movement of said ring, and
   actuating means for causing circumferential movement of the ring for actuation the doors in unison.

2. A bleed valve construction as in claim 1 in which ball joints connect the link to the ring and to the arms.

3. A bleed valve construction as in claim 1 in which the actuating means includes a rack on the ring, a motor, and a pinion carried by and driven by the motor and in mesh with the rack.

4. A bleed valve construction as in claim 1 including door frames attached to and surrounding the bleed openings in the outer case and hinges on these frames by which the individual doors are mounted in said frames.

5. A bleed valve construction as in claim 1 in which the outer wall is surrounded by an outer case defining, between it and the outer wall of the case, a plenum chamber into which the bleed doors open.

6. A bleed valve construction as in claim 5 in which the doors are mounted to move outwardly from the outer wall into the plenum chamber and the actuating ring and linkage are located in the plenum chamber.

7. A bleed valve construction as in claim 5 in which the plenum chamber has in its wall a valved opening for connection to an oil cooler and a metered opening through the outer case.

* * * * *